United States Patent [19]

Scholtholt

[11] Patent Number: 5,057,034
[45] Date of Patent: Oct. 15, 1991

[54] DISTRIBUTOR DEVICE FOR TELECOMMUNICATION SYSTEMS

[75] Inventor: Hans Scholtholt, Lohhof B Muenchen, Fed. Rep. of Germany

[73] Assignee: Siemens Aktiengesellschaft, Munich, Fed. Rep. of Germany

[21] Appl. No.: 540,112

[22] Filed: Jun. 19, 1990

[30] Foreign Application Priority Data

Jun. 28, 1989 [DE] Fed. Rep. of Germany ....... 3921208

[51] Int. Cl.⁵ ................................................ H01R 4/24
[52] U.S. Cl. .................................................... 439/402
[58] Field of Search .................................. 439/389–425

[56] References Cited

U.S. PATENT DOCUMENTS 3,702,456 11/1972 Patton .................................. 439/402
4,150,867 4/1979 Knickerbocker ..................... 439/402
4,468,079 8/1984 Knickerbocker ..................... 439/402

*Primary Examiner*—Joseph H. McGlynn
*Attorney, Agent, or Firm*—Hill, Van Santen, Steadman & Simpson

[57] ABSTRACT

A distributor for a telecommunication system provides that a system cable leading to the switching equipment of the system has its conductors introduced into retaining slots of a fixing part of the distributor at the factory and supplied together therewith. The fixing part is a component of a retainer for a plug connector strip having insulation-piercing terminals that project at the rear or system side thereof. When the plug connector strip is plugged into the retainer, the ends of the system lines that are fixed in a terminally-associated fashion are pressed into the slots of the insulation-piercing terminals. The on-site assembly expense is thereby considerably reduced.

17 Claims, 1 Drawing Sheet 5,057,034

DISTRIBUTOR DEVICE FOR TELECOMMUNICATION SYSTEMS

BACKGROUND OF THE INVENTION

1. Field of the Invention

The present invention relates to a distributor device for telecommunication systems, particularly telephone systems having a plug connector strip for incoming and outgoing lines.

2. Description of the Prior Art

Such a plug connector strip, for example, has been disclosed in general in the German Utility Model 7 809 651. In accordance therewith, system lines incoming from the switching equipment are fashioned as interconnects of a printed circuitboard onto which the plug connector strip has its rear side mounted. The interconnects are contacted with contacts of the plug connector that extend on a straight line to the front side of the plug connector strip and are fashioned thereat as knife-edge terminals to which the outgoing lines leading to the subscribers can be connected.

FIG. 12 of the German published application 2 814 018 discloses that the contacts and the rear side thereof likewise be constructed as knife-edge terminals to which the system lines fashioned as jumper wires can be connected. It is already standard to supply the cables leading from the switching equipment to the distributor with a plug connector at the system side. The allocation of the individual leads at the other end of the cable to the terminal elements did not occur until after the application of the plug connector strips to the distributors.

SUMMARY OF THE INVENTION

The object of the present invention is to simplify the connections of the lines to the plug connector strips.

The above object is achieved in a distributor device for telecommunication systems, particularly telephone systems, comprising a plug connector strip that is provided with knife-edge terminals for system lines incoming from a switching system and with terminal elements for outgoing lines leading to the subscribers, whereby the plug connector strip can have its own rear side mounted on a retaining part and wherein the knife-edge terminals for the system lines project at the rear side in the emplacement direction, and is particularly characterized in that the lead ends of the system lines are held in retaining slots of at least one comb-like fixing part corresponding to the position of the knife-edge terminals and which are terminal-associated transversely relative thereto, and in that the fixing part is fixed at the retaining part.

The particular advantage of the invention set forth above is that the lead ends at the distributor side can now likewise already be prepared at the factory for connection to the plug connector strips. The division of the individual leads onto the retaining slots of the fixing part is undertaken at the factory with the assistance of special tools. The risk of allocation errors is thereby reduced. The cable is then supplied with the fixing parts and the plug attached. The fixing part can then still be secured to the retaining part before the emplacement of the plug connector strip. The plug connector strips are only put in place as needed during the course of expanding the switching system.

When the plug connector strip is put in place, the knife-edge terminals are pushed into freed locations between the retaining slots. The transversely residing lead ends are thereby seized by the knife-edge terminals and are pressed into the terminal slots thereof. While being pressed in, the insulation of the lines is disrupted and removed down to the line core, so that a direct contact between the knife-edge terminal and the core of the wire is produced. Such contacts have also become well-known in the art as insulation-opening contacts or insulation-disrupting contacts. Since all lines are thereby simultaneously connected, the system expense is considerably reduced.

According to a particular feature of the invention, the distributor device is particularly characterized in that the separate fixing part can be introduced into the retaining part. Due to this feature, the fixing part can be kept relatively small, this facilitating transport. Furthermore, the leads can also be distributed in groups onto a plurality of small fixing parts. It thereby becomes possible to more easily conduct the cable through tight passages when being laid.

According to other features of the invention, the distributor device is particularly characterized in that the fixing part is joined of one piece with the retaining part, and in that each plug connector strip has its own retaining part assigned thereto. These features particularly come into consideration when no tight passages are present between the switching system and the distributor.

According to another feature of the invention, the distributor device is particularly characterized in that the retaining part can be put in place on a support rail that extends transversely relative to the plug connector strip and is held thereon with resilient catch tabs, and in that the retaining part comprises a clamping screw for fixing to the support rail in the longitudinal direction thereof. With this feature, the retaining part can be secured to the support rail without fastening holes or similar clearances having to be present thereat for this purpose. The support rail can therefore be fashioned as a simple, continuously smooth profile part.

According to another feature of the invention, a grounding conductor of a system cable containing the system lines can be contacted to the support rail with the clamping screw. The grounded conductor that, for example, is connected to the shielding of the cable is contacted in a simple manner with the support rail without special measures being required for this purpose.

According to another feature of the invention, the distributor device is particularly characterized in that a spring plate 21 is pressed against the support rail by the clamping screw, the spring plate being introduced into the retaining part. According to this feature, the grounded conductor or, respectively, the support rail is protected against damage by the clamping screw.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
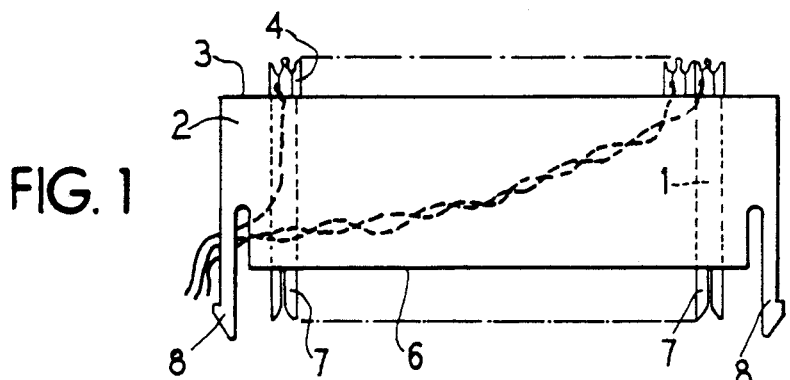
FIG. 1 is a side view of a plug connector strip for a distributor in a telecommunication system and constructed in accordance with the present invention.
Figure 2:
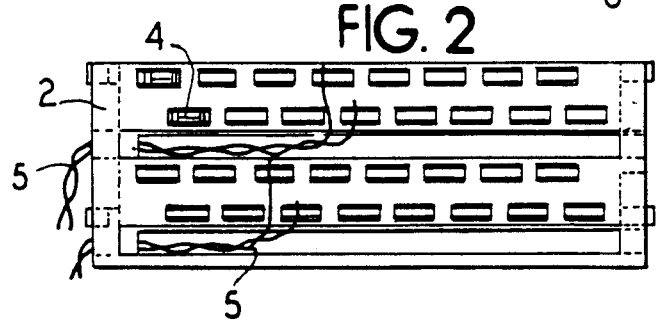
FIG. 2 is a plan view of the plug connector strip of FIG. 1.

Referring to FIGS. 1 and 2, two double rows of contacts 1 are mounted in a housing 2 of a plug connector strip. The contacts within a double row are arranged with an offset relative to one another. At their service side 3, the contact parts 1 are fashioned as terminal elements 4 for the outgoing subscriber lines 5. At the rear sides 6 of the distributor strip lying opposite the servicing side 3, the contact parts 1 are fashioned as knife-edge terminals 7 that project perpendicularly out of the housing 2. A pair of catch hooks 8 that project in the direction of the knife-edge terminal 7 and are provided with outwardly-directed catch noses are arranged at the end faces of the plug connector strip.

Figure 3:
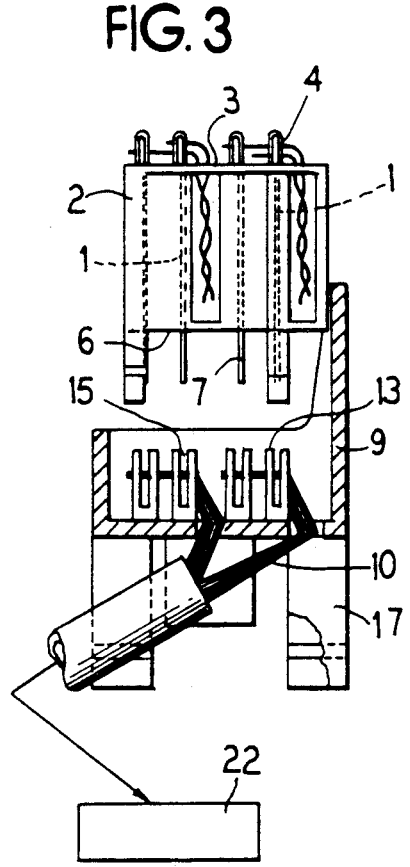
FIG. 3 is a front end view of the plug connector strip of FIG. 2 with a retaining part for the plug connector strip immediately before the joining together thereof.
Figure 4:
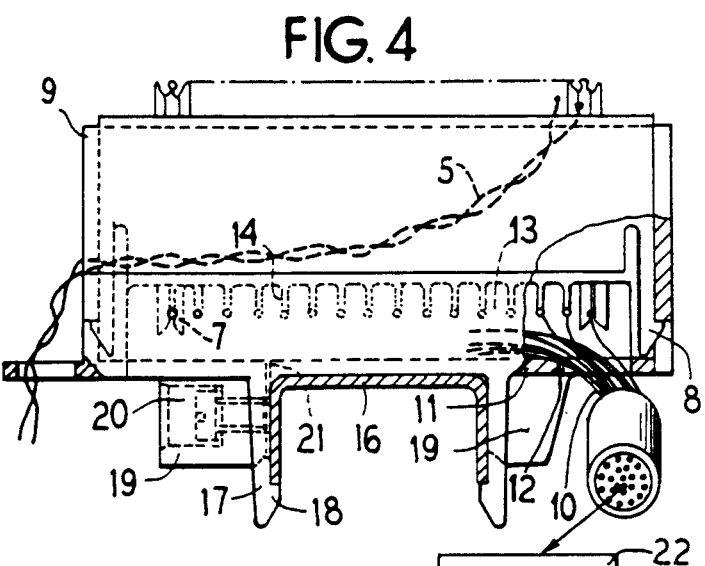
FIG. 4 is a side view of the elements of FIG. 3 after joining.
Figure 5:
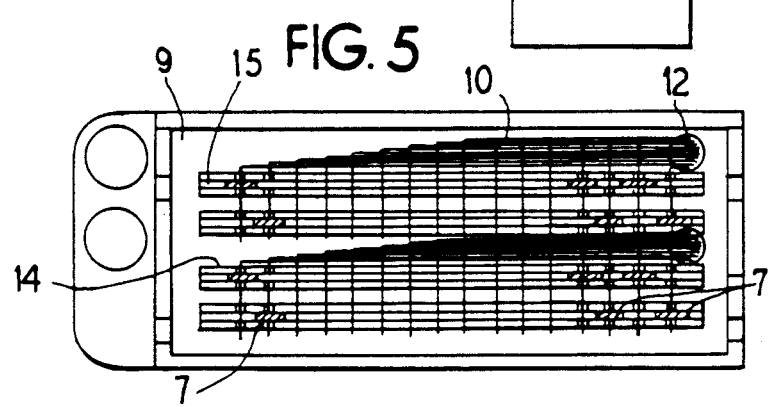
FIG. 5 is a plan view of the retaining part of FIG. 4.

According to FIGS. 3, 4 and 5, the housing 2, together with the contacts 1 is introducible into a well-shaped retaining part 9 and can be latched therein with the catch hooks 8. The cable having incoming system lines 10 is secured to the retaining part 9 at the rear side of the retaining part in a manner not shown in detail. A floor 11 of the retaining part 9 comprises openings 12 for receiving the system lines 10 therethrough.

Comb-like fixing parts 13 having retaining slots 14 project from the floor 11 toward the knife-edge terminal 7. The fixing parts 13 are joined to the retaining part 9 as a one-piece construction. They extend web-like in the row direction of the knife-edge terminal 7 whose plane of material coincides with this direction. The fixing parts 13 are provided with longitudinal slots 15 that serve as freed portions for receiving the distal ends of the knife-edge terminals 7. The retaining slots 14 extend transversely relative to the fixing parts and coincide in terms of their positions with the terminal slots of the knife-edge terminals 7.

Proceeding from the openings 12, the system lines 10 extend terminal-associated to the retaining slots 14 and are pressed therein in a clamping fashion. When the plug connector strip with the knife-edge terminal 7 is put in place, the terminals 7 grasp the ends of the system lines 10 that are thereby pressed into the terminal slots. During this procedure, the insulation of the system lines 10 is cut through, so that the knife-edge terminals 7 are directed contacted to the cores of the system lines 10.

The system lines 10 are already connected to the retaining part at the factory and are delivered together with the latter and with the cable terminated at its opposite end by an electrical connector 22. The retaining part 9 has its rear sides secured to a carrying or support rail 16 that has a U-shaped cross section. The support rail extends transversely relative to the longitudinal direction of the retaining part 9. In this manner, a plurality of retaining parts 9 can be joined to one another at the support rail for receiving respective plug connector strips.

The retaining part 9 comprises hook-like catch tabs 17 that embrace the support rail in a fork-like fashion. Catch noses 18 thereby engage behind the lateral legs of the support rail 16. The retaining part 9 is thus secured against being pulled off from the support rail 16.

The retaining part is also additionally provided with rear side clamp blocks 19 at both sides of the support rail 16. One of the clamp blocks 19 comprises a clamping screw 20 that can be screwed against a lateral leg of the support rail 16. The retaining part 9 with the clamp blocks 19 is thereby chucked at the support rail 16, so that it is fixed in the longitudinal direction thereof. A spring plate 21 is also arranged between the clamping screw 20 and the lateral leg of the support rail 16. The grounding wire of the system cable can be clamped between this spring plate 21 and the support rail and can be thereby contacted to the support rail. The spring plate 21 thereby protects the grounding wire and the support rail against damage by the clamping screw 20.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A distributor device for providing conductor distribution between system-side conductors and subscriber-side conductors in telecommunication systems, comprising:

a plug connector strip comprising an elongate contact housing of insulating material including a first elongate side as a system side, a second elongate side as a subscriber side, a first end and a second end and first and second hooks respectively extending from said first and second ends, and a plurality of contacts each including first and second insulation-piercing terminal ends and mounted offset from one another in rows in said contact housing with said first insulation-piercing terminal ends extending from said first side of said contact housing for connection to the systems-side conductors and said second insulation-piercing terminal ends extending from said second side of said contact housing for connection to the subscriber-side conductors, each of said insulation-piercing terminal ends including insulation-opening means for disrupting the insulation of a respective insulated conductor and contacting the conductor thereof as the insulated conductor is pressed into the respective insulation-opening means; and a retainer of insulating material for receiving and holding said plug connector strip, and comprising a bottom wall having cable openings therethrough for receiving the insulated conductors of respective system-side cables therethrough, first and second spaced side walls extending perpendicular to said bottom wall and first and second end walls extending perpendicular to said bottom wall, said walls together defining a cavity for receiving said plug connector strip with said first side facing said bottom wall, said first and second end walls each including a shoulder spaced from said bottom wall to be engaged by a respective one of said catch hooks upon mating of said plug connector strip to said retainer, fixing means including a plurality of combs extending from said bottom wall in spaced pairs with each pair of said combs allocated to and for receiving said first terminal ends of said contacts of a respective row of said contacts therebetween, each of said combs including conductor holding means for holding the cable conductors of a shielded cable spaced from said bottom wall in the plugging paths of and for contacting by respective ones of said first insulation-piercing terminal ends, and mounting means carried by said bottom wall for mounting said retainer to a support rail.

2. The distributor device of claim 1, wherein the support rail comprises a U-shaped cross-section, and wherein:

said mounting means of said retainer comprises a pair of spaced catch hooks each including a catch nose for engaging opposite sides of the support rail with said catch noses engaging opposite distal ends of the legs of the U-shaped cross-section.

3. The distributor device of claim 1, wherein:

said retainer comprises a pair of clamp members carried spaced apart on said bottom wall to receive the support rail therebetween; and a screw is mounted in one of said clamp members for tightening against the support rail.

4. The distributor device of claim 3, wherein:

a metal spring is mounted between said screw and the support rail for clamping the ground conductor of the shielding of the cable.

5. The distributor device of claim 1, wherein:

said contact housing comprises a plurality of walls defining troughs opening through said second side and at least said first end for receiving the subscriber-side conductors therethrough.

6. The distributor device of claim 5, wherein:

said retainer comprises a flange with holes therethrough for receiving the subscriber-side conductors therethrough.

7. Connection apparatus for connection to system-side equipment of telecommunications systems, said connection apparatus adapted for mating connection with a connector strip for plug-in connection to subscriber-side equipment and which includes a connector housing and a plurality of spaced insulation-piercing contacts extending from said housing offset from one another in a plurality of rows, comprising:

a multiconductor cable including first and second ends;

an electrical connector connected to the cable conductors at said first end of said cable for releasable connection to the system-side equipment;

a retainer for receiving the connector strip including an elongate base and a plurality of spaced elongate comb structures extending from said base and each including alternate teeth and slots spaced equal to the spacing of said insulation-piercing contacts for gripping and holding the conductors pressed therein at said second end of said cable spaced from said base such that the conductors are mechanically and electrically connected to said insulation-piercing contacts upon mating of the connector strip to said retainer.

8. The connection apparatus of claim 7, wherein:

mounting means is connected to and depends from said base and includes spaced members for embracing a support rail.

9. The connection apparatus of claim 8, wherein:

said mounting means is oriented such that said elongate base extends transversely of the support rail.

10. The connection apparatus of claim 8, wherein the support rail includes a U-shaped cross-section comprising a crossbar and a pair of legs each including an edge, and wherein:

said elongate base is received on said crossbar, each of said members embraces a respective one of said legs and includes a shoulder facing opposite to and engaging the respective edge.

11. The connection apparatus of claim 8, wherein:

said mounting means comprises two pairs of said spaced members and a pair of opposed clamp members each located between a pair of said spaced members for embracing the support rail therebetween, and a screw in one of said clamp members for tightening against the support rail.

12. The connection apparatus of claim 7, wherein:

said plurality of spaced elongate comb structures comprises a pair of said comb structures for each row of said insulation-piercing contacts, said insulation-piercing contacts of a row being received, upon plugging, between a respective pair of comb structures.

13. The connection apparatus of claim 12, wherein:

each of said comb structures includes two rows of aligned alternate teeth and slots so that each conductor is held at at least two locations with a center location free for contacting by a respective insulation-piercing contact.

14. A distributor for connecting telecommunications system lines, extending from system equipment in the form of a shielded multiconductor cable, to subscriber lines in the form of individual conductors, the conductors of said cable and the individual conductors being insulated conductors including insulation covering a conductor and one of which is a stripped ground conductor connected to the shield of the cable, said distributor to be mounted on a U-shaped support rail which includes a crossbar and legs having respective edges, said distributor comprising:

a plug-in connector strip having a plugging direction and including a contact housing including an elongate first side, an elongate second side, a first end, a second end, a first catch hook depending from said first end and including a first surface facing opposite the plugging direction, and a second catch hook depending from said second end and including a second surface facing opposite the plugging direction, and a plurality of contacts mounted spaced offset from one another in rows in said contact housing, each of said contacts including a first insulation-piercing terminal extending from said first side of said contact housing for plug-in connection to a respective cable conductor and a second insulation-piercing terminal extending from said second side for receiving, opening the insulation of and contacting the conductor of a respective individual conductor of the subscriber lines when the same is pressed therein; and a retainer comprising an elongate bottom wall, mounting means extending from said bottom wall for mounting said retainer to the support rail, said mounting means including spaced first and second pairs of spaced catch hooks depending from said bottom wall, said pairs spaced longitudinally along said bottom wall and said catch hooks of each pair spaced transversely across said bottom wall, each of said catch hooks including a catch surface facing opposite the plugging direction to engage the edges of the legs with said bottom wall resting on the crossbar of the U-shaped support rail, and a pair of clamp members each depending from said bottom wall between said catch hooks of a respective pair of said catch hooks for embracing the legs of the U-shaped support rail, a spring member between one of said clamp members and the respective leg of the U-shaped support rail, and a screw extending through said one of said clamp members for tightening against the respective leg of the U-shaped support rail via said spring and clamping the stripped ground conductor between said spring and the respective leg, a plurality of walls extending from said bottom wall and therewith defining a cavity for receiving the plug-in connector strip and including a first end wall and a second end wall having respective first and second openings therein limited by first and second edges facing in the plugging direction, said first and second surfaces of said first and second catch hooks engaging against said first and second edges upon plugging to secure said contact housing to said retainer; and a plurality of spaced parallel elongate comb-like structure projecting from said bottom wall each including alternate teeth and slots, the slots of said spaced parallel comb-shaped structures aligned with plugged-in locations of said first insulation-piercing terminals for receiving and holding respective ones of said conductors of said cable spaced from said bottom wall, each of said cable conductors held by at least two of said comb-like structures on respective sides of the plugged-in location of the respective insulation-piercing terminal.

15. The distributor of claim 14, wherein:

said contact housing comprises a plurality of walls defining troughs opening through said second side and at least said first end for receiving the subscriber equipment conductors therethrough.

16. The distributor of claim 15, wherein:

said retainer comprises a flange with holes therethrough for receiving the subscriber equipment conductors therethrough.

17. A distributor for connecting telecommunications system lines, extending from system equipment in the form of a shielded multiconductor cable, to subscriber lines in the form of individual conductors, the conductors of said cable and the individual conductors being insulated conductors including insulation covering a conductor, said distributor comprising:

a plug-in connector strip having a plugging direction and including a contact housing of insulating material and a plurality of contacts mounted spaced apart in said contact housing and including first and second insulation-piercing ends, said housing including a systems side and a subscriber side, the first ends extend from said systems side and said second insulation-piercing ends extending from said subscriber side, said second insulation-piercing ends provided for mechanically gripping and electrically connecting to the individual conductors, said contact housing comprising first catch means;

a comb structure for individually receiving and supporting the insulated conductors with a spacing equal to that of said contact; and a retainer supporting said comb structure and including second catch means for cooperable engagement and attachment of said connector strip to said retainer upon plugging of said connector strip to said retainer, said first insulation-piercing ends engaging, mechanically gripping and electrically connecting the conductors of said insulated conductors of said cable upon plugging.

* * * * *